United States Patent [19]

Paton

[11] Patent Number: 4,613,114
[45] Date of Patent: Sep. 23, 1986

[54] SUSPENSION STRUT
[76] Inventor: H. Neil Paton, 2521 W. Montlake Pl. East, Seattle, Wash. 98112
[21] Appl. No.: 587,520
[22] Filed: Mar. 8, 1984
[51] Int. Cl.[4] .............................................. F16F 13/00
[52] U.S. Cl. .................................... 267/9 R; 188/67; 188/129; 188/322.17; 248/562; 248/636; 267/33; 267/140.1; 277/116.2; 277/117; 277/191
[58] Field of Search ............ 188/67, 129, 271, 321.11, 188/322.17; 267/34, 35, 33, 9 R, 9 A, 9 C, 134, 135, 140.1; 277/116.2, 117–122, 190, 191; 248/631, 636, 562; 280/712

[56] References Cited

U.S. PATENT DOCUMENTS

| Re. 20,030 | 7/1936 | Ledwinka | 280/166 |
|---|---|---|---|
| 769,841 | 9/1904 | Shepard | 267/9 R |
| 1,050,870 | 1/1913 | Stickley | 277/122 X |
| 1,169,625 | 1/1916 | Dryer . | |
| 1,510,017 | 9/1924 | Schmidt | 267/9 R |
| 1,696,478 | 12/1928 | Hall | 267/9 A |
| 2,381,404 | 8/1945 | Cottrell | 267/9 R |
| 2,426,661 | 9/1947 | Anderson | 267/9 C X |
| 2,490,738 | 12/1949 | Lehrman | 267/9 R |
| 2,497,829 | 2/1950 | Baselt | 267/9 R |
| 2,516,072 | 7/1950 | Piron | 267/9 R |
| 2,534,419 | 12/1950 | Dath | 267/9 R |
| 2,549,036 | 4/1951 | Withall | 267/9 R |
| 2,552,668 | 5/1951 | Dath | 267/9 A |
| 2,574,788 | 11/1951 | Janeway et al. | 267/9 R |
| 2,614,831 | 10/1952 | Withall | 267/9 A |
| 2,747,696 | 5/1956 | Blattaer | 267/9 C X |
| 2,752,149 | 6/1956 | Forcellini | 267/9 R |
| 2,753,177 | 7/1956 | Boyd | 267/9 R |
| 2,767,858 | 10/1956 | Fillion | 213/45 |
| 2,814,392 | 11/1957 | Campbell | 213/33 |
| 2,818,249 | 12/1957 | Boschi | 267/33 |
| 2,819,060 | 1/1958 | Neidhart | 267/63 R |
| 2,841,292 | 7/1958 | Campbell | 213/32 |
| 2,844,366 | 7/1958 | Butterfield | 267/9 C X |
| 3,039,757 | 6/1962 | Barr | 267/9 R |
| 3,054,478 | 9/1962 | Rumsey | 188/129 |
| 3,145,012 | 8/1964 | Kfoury | 248/358 |
| 3,161,420 | 12/1964 | Rix | 280/124 |
| 3,178,036 | 4/1965 | Cardwell | 213/33 |
| 3,372,947 | 3/1968 | Donnecke | 267/63 R |
| 3,402,924 | 9/1968 | Rix | 267/63 R |
| 3,409,284 | 11/1968 | Rix | 267/63 R |
| 3,417,986 | 12/1968 | Fuke | 267/33 |
| 3,434,708 | 3/1969 | Hawk, Jr. | 267/63 R |
| 3,480,268 | 11/1969 | Fishbaugh | 267/63 R |
| 3,537,696 | 11/1970 | Webster, Jr. | 267/63 R |
| 3,640,545 | 2/1972 | Citroen | 280/124 |
| 3,677,535 | 7/1972 | Beck | 267/63 R |
| 3,713,516 | 1/1973 | Freyler | 188/129 |
| 3,762,694 | 10/1973 | MacDonnell | 267/3 |
| 3,820,634 | 6/1974 | Poe | 188/129 |
| 4,010,940 | 3/1977 | Freyler | 267/9 B |
| 4,032,125 | 6/1977 | Minakawa et al. | 267/63 A |
| 4,089,511 | 5/1978 | Palmer | 267/8 R |
| 4,105,222 | 8/1978 | Buchwald | 280/668 |
| 4,106,596 | 8/1978 | Hausmann | 188/314 |
| 4,140,304 | 2/1979 | Ghrist | 267/63 R |
| 4,230,047 | 10/1980 | Wiebe | 105/197 D |
| 4,316,604 | 2/1982 | Makita | 267/64.19 |
| 4,358,096 | 11/1982 | Paton | 267/9 C |
| 4,415,146 | 11/1983 | Sitko | 267/9 C |
| 4,473,216 | 9/1984 | Paton et al. | 267/9 C |
| 4,475,722 | 10/1984 | Paton et al. | 267/9 C |

FOREIGN PATENT DOCUMENTS

| 2320913 | 11/1973 | Fed. Rep. of Germany | 188/321.11 |
|---|---|---|---|
| 2553890 | 6/1977 | Fed. Rep. of Germany . | |
| 553706 | 1/1957 | Italy . | |
| 157848 | 9/1978 | Netherlands | 188/321.11 |
| 354991 | 6/1961 | Switzerland . | |
| 7090805 | 5/1954 | United Kingdom . | |
| 771392 | 4/1957 | United Kingdom . | |
| 832878 | 4/1960 | United Kingdom . | |
| 1238641 | 7/1971 | United Kingdom . | |
| 1489473 | 10/1977 | United Kingdom . | |

OTHER PUBLICATIONS

Supplemental Statement Under 37 C.F.R. S 1.56 for Ser. No. 349,582 filed Mar. 10, 1983, issuing as U.S. Pat. No. 4,473,216.

Primary Examiner—George E. A. Halvosa

[57] ABSTRACT

A frictional damping assembly operated by a load bearing spring assembly, either an elastomerically damped coil spring or a reinforced elastomeric spring, together provide damped, resilient load bearing support for a telescoping load bearing assembly. The strut is particularly suitable for use in front and/or rear suspensions of light weight passenger vehicles.

9 Claims, 4 Drawing Figures

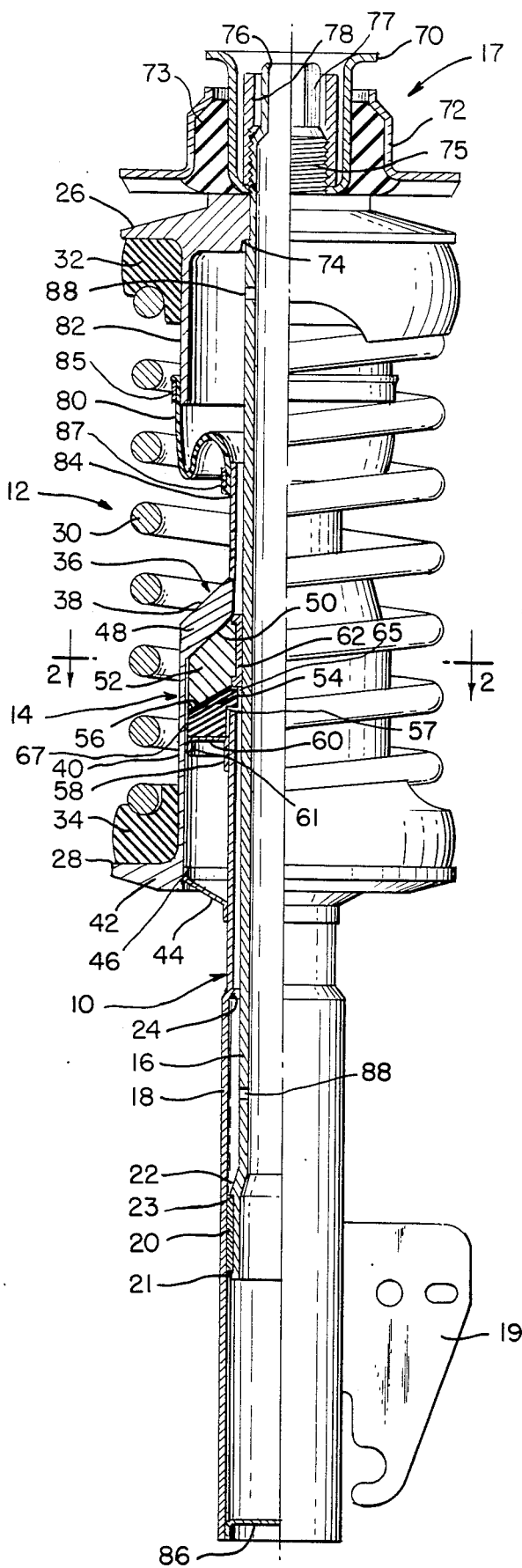
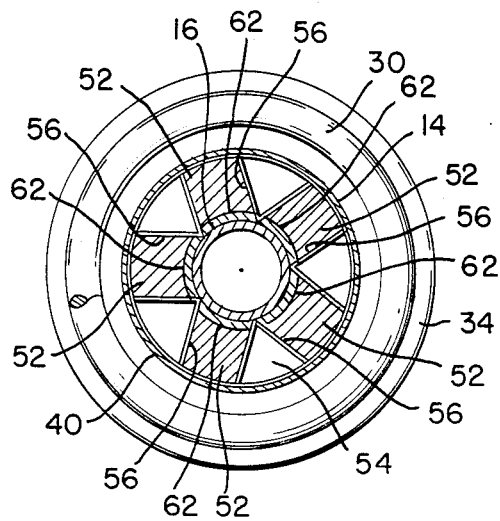
FIG. 1
FIG. 2

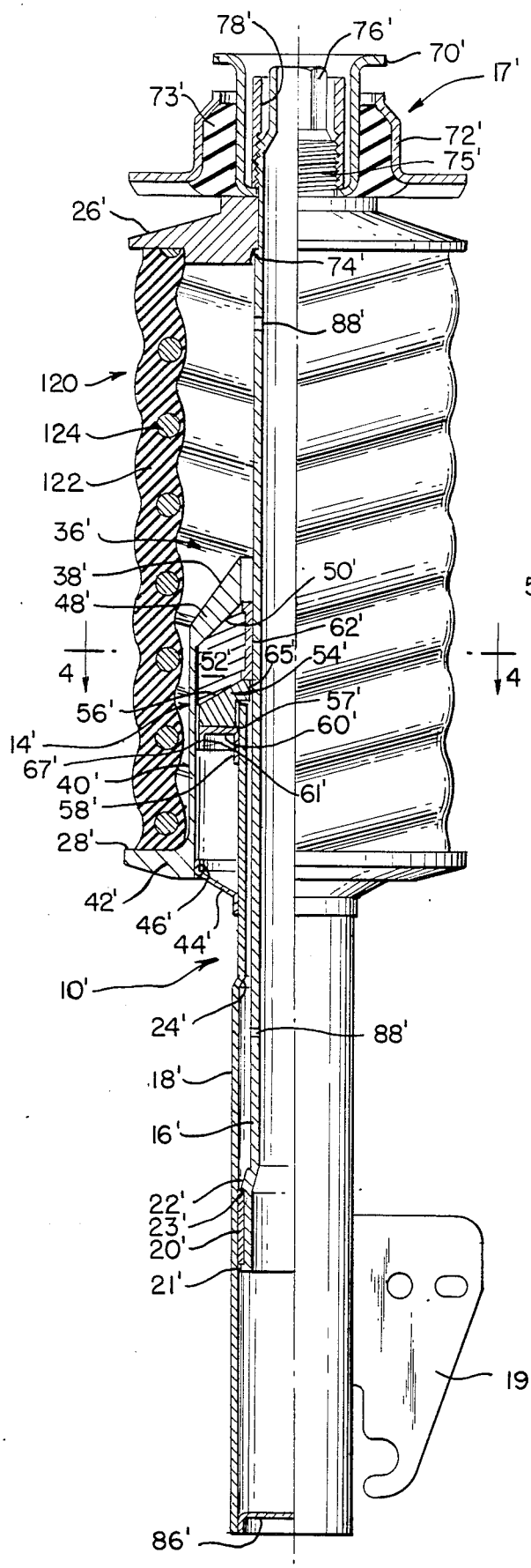
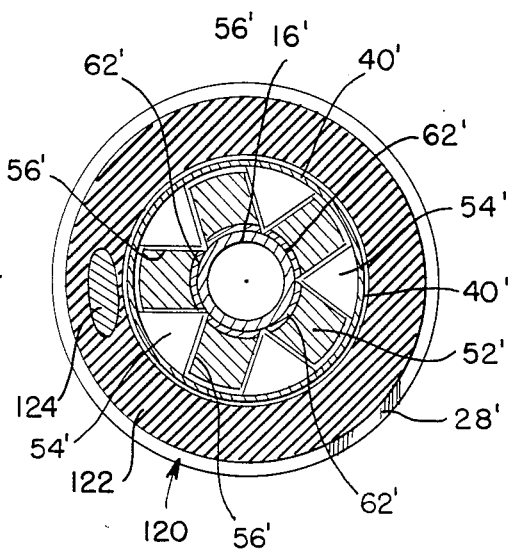
FIG. 3
FIG. 4

4,613,114

SUSPENSION STRUT

BACKGROUND OF THE INVENTION

This invention relates to vehicle suspensions and, more particularly, to strut type vehicle suspension. While two presently preferred embodiments of the invention are disclosed herein for application as front and/or rear suspensions of light weight passenger vehicles, the invention is not limited to such applications and may be used with other types of suspensions and vehicles.

A promising frictionally damped suspension strut of this type is disclosed in U.S. Pat. No. 4,473,216, issued to applicant and others on Sept. 25, 1984. This invention is an improvement of this strut that makes it even more suitable for application as front and/or rear suspensions for light weight passenger vehicles, and in particular as a retrofit or replacement for MacPherson struts.

SUMMARY OF THE INVENTION

An object of this invention is to provide a suspension strut that combines frictional damping and resilient load bearing effects.

Another object of this invention is to provide a suspension strut having improved frictional damping means.

Another object of this invention is to provide a suspension strut having simplified load bearing spring means, including among others an elastomerically damped coil spring or a reinforced elastomeric spring.

Another object of this invention is to provide a suspension strut that includes improved frictional damping means unaffected by rotative movement of a telescoping load bearing assembly.

Another object of this invention is to provide a suspension strut that includes simplified bearing means acting between telescoping load bearing members.

Another object of this invention is to provide a suspension strut that includes a telescoping load bearing assembly resistive to the effects of bending loads.

Another object of this invention is to provide a suspension strut that includes a telescoping load bearing assembly having a simplified assembly connection.

Still another object of this invention is to provide a frictionally damped suspension strut having an overall length, diameter, and general configuration such that it is adaptable for use within the length, wheel clearance, and other requirements associated with MacPherson type struts that are or may be used in the front and/or rear suspensions of passenger cars.

To achieve these objects in accordance with the principles of this invention, this invention provides an improved suspension strut that comprises a telescoping load bearing assembly extending through load bearing spring means and force responsive frictional damping means that are operative, respectively, to provide resilient load bearing support for and dampen telescopic movement of the load bearing assembly when it is subjected to an axial load. The damping means are operated by the spring means and are interposed between the spring means and the load bearing assembly. According to further principles of this invention, the spring means are made up of an elastomerically damped coil spring assembly or a reinforced elastomeric spring; however, other types of springs may be used.

Among the advantages of this invention are that: it is fluid-free and therefore does not require hydraulic valving or seals; it is relatively insensitive to temperature; through controlled, progressive wear of the frictional wear elements, damping is self compensating for wear and is wear-discernable; it has fewer parts and therefore is more economical to fabricate and is more reliable than hydraulic struts; it is economical to service and maintain; and it may be tailored for specific ride conditions and loads.

These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective view, partially in longitudinal section, of one presently preferred embodiment of the suspension strut of this invention;

FIG. 2 is a section taken along the line 2—2 in FIG. 1;

FIG. 3 is a perspective view generally similar to FIG. 1 of a second presently preferred embodiment of the suspension strut of this invention;

FIG. 4 is a section taken along the line 4—4 in FIG. 3.

DETAILED DESCRIPTION OF THE DRAWINGS

Referring to FIG. 1, one presently preferred embodiment of the suspension strut of this invention comprises a telescoping load bearing assembly (generally referenced by numeral 10) that extends through an elastomerically damped coil spring assembly (generally referenced by numeral 12) and a force responsive frictional damping assembly (generally referenced by numeral 14). The spring assembly 12 and the damping assembly 14 respectively provide resilient load bearing support for and dampen telescopic movement of the load bearing assembly 10. The spring assembly 12 provides the sole source of resilient load bearing support for the load bearing assembly 10. The damping assembly 14 is operated by the spring assembly 12. With this construction, the ride frequency obtained (i.e., the frequency at which the body or sprung mass oscillates with respect to the wheel) remains substantially constant within a predetermined load range. As the front and/or rear suspension of a light weight passenger vehicle, this load range may be selected so that it corresponds to the optimum load range of the vehicle.

Unlike the strut disclosed in U.S. Pat. No. 4,473,216 however, the damping assembly is interposed between the spring assembly and the load bearing assembly. This construction yields several important advantages, among which are: the provision of more axial space to receive the spring assembly; the ability to vary the length of this space to receive spring assemblies of varying lengths, through simple alteration in the construction; the provision of greater spacing between the load bearing assembly bearing means; the use of only one dedicated bearing, the other bearing being the damper shoes that make up part of the damping assembly; the reduction in the number of parts and weight; and improved means for circulating air into and out of the load bearing assembly and the damping assembly.

The load bearing assembly 10 includes two telescopically movable tubular members, an inner member 16 and an outer member 18, adapted to extend and contract reciprocatively from a design position (FIG. 1) toward an extended rebound position and a contracted jounce position, respectively. The inner ends of these members are telescopically movable a distance related to the lengths of the rebound and jounce strokes of the load bearing assembly. The outer ends of these members are adapted to be secured to a vehicle; in the example, the outer end of member 16 is adapted to be secured to a vehicle body (not shown) by mounting assembly 17 and the outer end of member 18 is adapted to be secured to a vehicle steering arm or knuckle (not shown) by mounting assembly 19.

Two spaced apart bearing means act between the members 16 and 18 to promote telescoping movement of them, and are spaced apart axially a distance sufficient to minimize the effects of bending loads. In the example illustrated in FIG. 1, these bearing means are provided in the form of a sleeve bearing 20 mounted by the inner end of member 16 and friction shoes 62 located adjacent the inner end of member 18. (The shoes 62 also serve as part of the damping assembly 14, as will be described presently.) The inner end portion of member 16 underlying bearing 20 is of enlarged diameter that registers with the diameter of the outer end portion of member 18 for a distance corresponding to the rebound stroke of assembly 10. Rebound stops 22 and 24 are formed by the closures of these enlarged diameter portions. These stops engage one another at the rebound position of the load bearing assembly 10 to prevent it from over-extending. Bearing 20 is held in position within a recess formed between two spaced apart shoulders 21 and 23. Bearing 20 may be formulated of any suitable low friction material, preferably a material having a coefficient of static friction that is less than its coefficient of dynamic friction.

The spring assembly 12 acts between member 16 and the damping assembly 14. It is compressed axially between a first spring support 26 mounted an the outer end of member 16 and a second spring support 28 formed on the damping assembly 14, in response to an axially applied load on the strut. In the example illustrated in FIG. 1, the axial length of the spring assembly and hence the distance between supports 26 and 28 is greater than the distance from support 26 to the inner end of member 18. The spring assembly, however, could be shorter and the distance between supports 26 and 28 reduced accordingly, provided the length of the spring assembly is at least equal to the spacing between support 26 and the inner end of member 18. The spacing between supports 26 and 28 may be varied within these limits to receive spring assemblies of varying lengths, as will be described hereinafter. As a consequence, it is possible to use spring assemblies of different lengths, depending upon the resilient load bearing effects desired.

The FIG. 1 spring assembly 12 includes a coil spring 30 and two annular elastomeric pads 32 and 34 respectively mounting the ends of spring 30 on supports 26 and 28. The assembly provides a nonlinear spring curve; that is, the spring rate is not constant throughout the entire range of spring deflections. The assembly also includes viscous damping derived from the elastomeric pads 32 and 34. These pads act as viscous damping elements in response to so-called "tar-strip" or other pulse-like or high frequency load conditions to which the damping assembly 14 has relatively low response sensitivity. The amount of viscous damping required, however, will be dependent upon the degree of nonlinearity in the spring curve, and hence stiffness of, the spring assembly under such load conditions. Thus, while preferably both ends of the spring are supported by elastomeric pads, as shown (FIG. 1), only one end could be so supported or elastomer could be otherwise included in the spring assembly, provided sufficient viscous damping is obtained. Accordingly, the construction and arrangement shown is illustrative and not limiting.

The damping assembly 14 is made up of an inverted bell-shaped spring carrier 36 that includes a generally conical portion 38 and a generally tubular portion 40 that terminates in a transverse annular flange portion 42. This flange portion forms spring support 28. An annular flange 44 is secured to and projects transversely from the outer surface of member 18, and terminates in a cylindrical portion 46 that underlies and supports portion 42. Flange 44 encloses the lower end of carrier 36 to prevent or minimize entrance of dirt and other contaminants into the interior of the damping assembly 14. A low friction bearing surface is formed along the outer face of portion 46 to provide low friction sliding contact with the interior surface of portion 42. Any suitable low friction material may be applied to the outer face of portion 46 to form this surface.

As will now be appreciated, the spacing between supports 26 and 28 is dependent upon the axial length of portion 40. Thus, merely by forming carrier 36 with portion 40 of greater or lesser axial length, it is possible to vary the spacing between supports 26 and 28 correspondingly. Alternately, a separate annular flange forming support 28 could be secured to portion 40 at selected axial locations. Such a flange could be used as a substitute for or in conjunction with portion 42, depending upon the versatility in changing spring assemblies desired.

Still referring to the damping assembly 14 (FIG. 1), portion 38 forms a first wedge ring 48 that includes a plurality of circumferentially spaced apart, recessed flats 50 that extend radially toward the center line of the load bearing assembly 10. These respectively register with and overlie five damper wedges 52 (FIG. 2) that are spaced apart at equal intervals about the circumferance of the strut. A second wedge ring 54 underlies wedges 52, and includes flats 56 (FIGS. 1 and 2) identical to flats 50. Wedges 52 thus are guided by flats 50 and 56 for converging movement in an essentially radial direction. Low friction bearing surfaces are formed within all of the flats 50 and 56 to promote such movement. Any suitable low friction material may be applied to the flats to form these surfaces. Although the wedge ring 48 is illustrated as being formed by portion 38, it could be formed as a separate part that registers with the interior surface of portion 38.

When the strut is used as a front suspension for light weight passenger vehicles, member 18 may shift rotatively about member 16 in response to turning input to the steering arm or knuckle. In this and other applications in which rotative shifting of member 18 occurs, it is desirable to isolate the damper wedges from the effects of this shifting. Accordingly, it presently is preferred to allow the wedge ring 54 to "float" with respect to member 18. The wedge ring includes a shoulder 57 that overlaps the inner end of member 18, together with a cross-sectional outline that registers with but is closely spaced from member 16 and portion 40 at 65 and 67, respectively. Consequently, there is essentially no contact between member 18 and ring 54 at any of these locations except to position it in coaxial alignment with the inner end of member 18, as shown (FIG. 1). A flange 58 is secured to and projects transversely from the outer surface of member 18 a short distance from its inner end, as shown (FIG. 1). It is this flange that supports the wedge ring 54. Flange 58 includes a transverse radial portion 60 that underlies and supports ring 54 in a fixed axial position in load transmitting relation with member 18, as will be described presently. Flange 58 terminates in a cylindrical portion 61 that underlies and supports portion 40. As is the case of portion 46, a low friction bearing surface is formed along the outer face of portion 61.

The interface between wedge ring 54 and portion 60 acts to prevent or substantially eliminate transmission of all but axial loads from member 18 to ring 54. Low friction bearing surfaces generally similar to those formed at portions 46 and 61 are formed along the inner face of portion 60 and the exterior surface of member 18 from its inner end to the location of portion 60. These surfaces promote low friction sliding movement between portion 60, member 18 and the opposed faces of ring 54. Further, the spacing at 65 and 67 eliminates or minimizes any contact between ring 54, member 16 and portion 40. Consequently, ring 54 is isolated from most if not all of the effects of nonaxial forces that appear at the inner end of member 18.

Each damper wedge 52 includes two inclined contact surfaces that are in face-to-face contact, respectively, with flats 50 and 56. The lateral surfaces of each wedge 52 are curved in general conformance with the curvatures of the outer surface of member 18 and the inner surface of portion 40. A damper shoe 62 is mounted by the interior lateral face of each wedge 52 and is of a width corresponding to the width of the wedge. In the example, each shoe is composed of the same material as bearing 20, and also serves as one of two bearing means acting between members 16 and 18. The exposed surface of each shoe constitutes a curved wear face that registers with the outline of the outer surface of member 18. When the shoes are urged into face-to-face contact with the outer surface of member 18, a frictional drag force is applied to member 18, resisting extension or contraction of the load bearing assembly.

The damper wedges 52 are urged inwardly by the wedging action produced between wedge rings 48 and 54 in response to the axial force produced by carrier 36 being drawn toward the outer end of member 18. This is of course the result of the axial force generated by spring assembly 12 being compressed between supports 26 and 28 in response to an axially directed load on the strut. The damper wedges are thus urged inwardly in unison, and produce an aggregate drag force that is proportional to the axial load applied to the strut. This drag force is controllable in accordance with the angles of inclination of the inclined contact surfaces of the wedge rings and damper wedges with respect to the longitudinal strut axis, or the coeffcients of friction of the material forming these surfaces, or both. The drag force may even be controlled so that it varies depending upon whether the strut is being subjected to jounce or rebound conditions. For many light weight passenger vehicle applications, for example, the drag force preferably is greater during rebound conditions than jounce conditions. One way to accomplish this is to vary the angles of inclination of the contact surfaces as illustrated in FIG. 1, so that the surfaces at 56 are disposed at a greater inclination to the longitudinal strut axis than the surfaces at 50.

As the damper shoes gradually wear away during use, the damper wedges are urged further inward. This compensates for the effects of wear so that the aggregate drag force obtained remains essentially constant, and further provides a discernable indication of shoe wear based upon the degree of inward wedge shift over the anticipated service life of the damper shoes. The damper shoes may be replaced when the wear exceeds acceptable levels by disassembling the strut, as will be described presently, removing carrier 36, and then replacing the existing damper wedges and worn shoes with fresh ones. This replacement may be effected on a periodic basis or when indicated by a sensor responsive to inward wedge shift.

Still referring to FIG. 1, the body mounting assembly 17 includes a tubular collar 70 that is surrounded by a flanged housing 72. These are of conventional design and are compatible with the body mounts customarily used for MacPherson struts. The space between the collar 70 and housing 72 is filled with elastomer 73 or other shock absorber material. The outer end portion of member 16 includes an annular shoulder 74 that is engageable with support 26, with member 16 extending through a central bore formed in support 26. The outer end portion of member 16 is threaded externally at 75 and terminates in an outer end 76 that includes flats 77 or is otherwise shaped to be engageable with an appropriate holding tool. Member 16 is secured in the position illustrated in FIG. 1 by a threaded sleeve 78 that is threaded onto member 16 and, when tightened, causes shoulder 74 to engage and be pulled against support 26. Thus, the load bearing assembly may be disassembled simply by loosening and removing sleeve 78, and then withdrawing the outer end of member 16 from collar 70. In the assembled position illustrated, end 76 projects outwardly beyond the end of sleeve 78 when sleeve 78 is fully tightened. This allows end 76 to be held against rotation by a holding tool when the strut is being mounted on or dismounted from a vehicle.

In most practical applications, it may be necessary or desirable to prevent dirt and other material from accumulating upon the exposed surface of member 16, at least in those areas that are subjected to frictional drag forces. To this end, a flexible boot 80 may be mounted between support 26 and housing 36. In the example, support 26 includes a cylindrical skirt portion 82 that supports the outer end of boot 80. A cylindrical member 84 projects axially from portion 38 and supports the inner end of boot 80. Appropriate mounting bands 85 and 87 secure the ends of boot 80 to portion 82 and member 84, respectively. As will be appreciated, wiper seals or other known means of removing dirt or other material from the exposed surface of member 16 could be used in place of boot 80.

The FIG. 1 strut may be air cooled to minimize the effects, if any, of frictional heating. The outer end of member 16 is open, and admits air to the interior of the load bearing assembly 10. The outer end of member 18 is closed by a disc-like member 86. One or more air holes 88 allow air from the interior of member 16 to enter into and exit from the space bounded by carrier 36 and boot 80. Air also may enter into and exit from carrier 36 at 46, since that interface is not air tight. This flow of air is dependent in part by the frequency at which the strut is operated, since the load bearing assembly tends to act as an air pump as it extends and contracts. In addition to causing cool air to be moved past the damper wedges, this air flow tends to equalize the pressure within boot 80 with ambient pressure and, hence, prevents boot 80 from over expanding.

Referring now to FIGS. 3 and 4, a second presently preferred embodiment of the suspension strut of this invention is comprised of a load bearing assembly and a damping assembly that are essentially identical to assemblies 10 and 14 of the FIG. 1 strut. Accordingly, parts corresponding to those already described are not described further, and are designated with the same reference numerals, primed.

The spring assembly of the FIG. 3 strut (generally referenced by numeral 120), provides a nonlinear spring curve and viscous damping similar to the FIG. 1 spring assembly 12. Assembly 120 is comprised of a reinforced elastomeric spring made up of a tubular body 122 composed of elastomer and a coil spring 124 embedded in the elastomer to reinforce it against buckling. It will be recognized, however, that buckling reinforcement may be obtained by means other than a coil spring.

While two presently preferrred embodiments of this invention have been illustrated and described herein, variations will become apparent to one of ordinary skill in the art. Accordingly, the invention is not to be limited to the particular embodiments illustrated and described herein, and the true scope and spirit of the present invention are to be determined by reference to the appended claims.

The embodiments of the invention in which an exclusive property or privilege is claimed is defined as follows:

1. A suspension strut, comprising: a telescoping load bearing assembly including two outer ends, one of said outer ends including first spring support means; damping means for frictionally damping telescopic movement of said load bearing assembly in response to said strut being subjected to an axial load, said damping means including friction shoe means engageable with said load bearing assembly and a carrier movable with respect to said load bearing assembly and to said friction shoe means, said carrier having two ends, one of which includes second spring support means, and the other end of which is engaged with said friction shoe means at a region of contact on said friction shoe means, said carrier being of sufficient length that said second spring support means is spaced from said first spring support means by a distance greater than the distance between said first spring support means and said region of contact on said friction shoe means; and load bearing spring means for providing the sole source of resilient load bearing support of said load bearing assembly and for simultaneously providing a force operating said friction shoe means, said spring means having opposite ends supported by said first and second spring support means and urging said carrier away from said first spring support means and toward the other outer end of said load bearing assembly when said strut is subjected to an axial load; wherein said load bearing assembly extends through said damping and said spring means, said damping means is interposed between said spring means and said load bearing assembly, and said carrier causes said friction shoe means to engage with said load bearing assembly as said carrier is urged away from said first spring support means toward the other outer end of said load bearing assembly by said spring means.

2. The strut of claim 1, wherein said load bearing assembly further includes two telescopically movable members, one of said members including said other outer end, and wherein said damping means further includes first wedge means axially movable with respect to the other of said members and interposed between said second spring support means and said friction shoe means, and second wedge means axially fixed with respect to said one member and interposed between said friction shoe means and said one member, said second spring support means being operative to urge said first wedge means toward said second wedge means as said second spring support means is urged toward said other outer end, said first wedge means and said second wedge means being operative to urge said friction shoe means inwardly into engagement with said other member as said first wedge means is urged toward said second wedge means.

3. The strut of claim 2, wherein said one member includes an inner end supporting said second wedge means, and said other member includes an inner end movable within said one member, and wherein said load bearing assembly further includes first bearing means supported by the inner end of said other member and acting between said other member and said one member, and wherein said friction shoe means is further operative as second bearing means acting between said one member and said other member.

4. The strut of claim 2, wherein said damping means further includes means interposed between said second wedge means and the inner end of said one member for transmitting essentially only axial loads therebetween.

5. The strut of claim 1, wherein said one outer end further includes an externally threaded tubular portion and a tool receiving portion, and wherein said first spring support means includes mounting means for mounting said portion to a vehicle body, said mounting means including a sleeve connector threadably securable to said tubular portion with said tool receiving portion projecting outwardly from said connector.

6. The strut of claim 1, wherein said load bearing assembly includes means directing air from said one outer end to said damping means.

7. The strut of claim 1, wherein said spring means has a nonlinear spring rate and includes means providing viscous damping.

8. The strut of claim 7, wherein said spring means includes a coil spring and elastomeric support means supporting at least one end of said coil spring.

9. The strut of claim 7, wherein said spring means includes a tubular elastomeric body with buckling reinforcement means operatively associated therewith.

* * * * *